(12) United States Patent  (10) Patent No.: US 9,076,099 B2
Stanich et al.  (45) Date of Patent: Jul. 7, 2015

(54) IMAGE SCALING MECHANISM

(71) Applicants: Mikel John Stanich, Longmont, CO (US); Larry M. Ernst, Longmont, CO (US); John Thomas Varga, Longmont, CO (US)

(72) Inventors: Mikel John Stanich, Longmont, CO (US); Larry M. Ernst, Longmont, CO (US); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 13/945,044

(22) Filed: Jul. 18, 2013

(65) Prior Publication Data
US 2015/0022829 A1    Jan. 22, 2015

(51) Int. Cl.
*G06K 9/32* (2006.01)
*G06K 15/02* (2006.01)

(52) U.S. Cl.
CPC ........ *G06K 15/1873* (2013.01); *G06K 15/1881* (2013.01)

(58) Field of Classification Search
USPC ......... 382/298, 299, 266, 300, 209, 199, 103, 382/107, 260, 264, 274, 257, 301; 235/462.03; 358/525, 1.2; 348/598, 348/222.1, 606, 630, 624; 345/419, 473, 345/611, 638, 690
See application file for complete search history.

(56) References Cited

U.S. PATENT DOCUMENTS

| | | | |
|---|---|---|---|
| 6,834,803 B2 | 12/2004 | Schuessler | |
| 6,928,196 B1 * | 8/2005 | Bradley et al. | 382/300 |
| 7,151,863 B1 * | 12/2006 | Bradley et al. | 382/299 |
| 7,218,417 B2 | 5/2007 | Lieberman et al. | |
| 7,593,600 B2 | 9/2009 | Prakash et al. | |
| 7,826,097 B2 | 11/2010 | Sanger et al. | |
| 7,876,979 B2 | 1/2011 | Lee et al. | |
| 8,135,230 B2 * | 3/2012 | Rempel et al. | 382/264 |
| 2006/0215186 A1 | 9/2006 | Ernst et al. | |

* cited by examiner

*Primary Examiner* — Anh Do
(74) *Attorney, Agent, or Firm* — Blakely, Sokoloff, Taylor & Zafman LLP

(57) ABSTRACT

A method is disclosed. The method includes receiving an image, upsampling the image, eroding the upsampled image to compensate for dot gain and scaling the eroded image to scale the image to a desired size.

13 Claims, 4 Drawing Sheets

Figure 3A
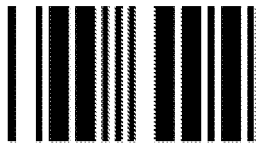 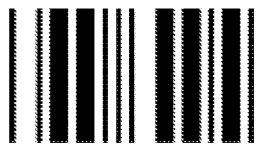 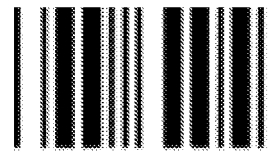
Figure 3B    Figure 3C    Figure 3D

IMAGE SCALING MECHANISM

FIELD OF THE INVENTION

The invention relates to the field of printing systems, and in particular, to the readability of scaled images generated at a printing system.

BACKGROUND

The binary encoding scheme is commonly used in modern bar code symbology design. Binary codes (such as Code 39) define the set of bar/space patterns making up its "language" or bar code character set using only two choices ("wide" or "narrow") for each bar and space of each pattern. The wide: narrow ratio can be selected when printing each bar code. Selecting a 2:1 ratio creates a more compact bar code; a 2.5:1 or 3:1 ratio makes the bar code wider, but also makes it easier for the scanner to distinguish wide elements from narrow ones, which is helpful when printing on rough cardboard, for example.

Printed barcodes that have been converted to a different dots per inch (DPI) density typically have issues with readability due to dot gain and the scaling method. For instance, printer dot gain increases bar widths by producing bars that are too wide while making spaces too small, thus decreasing the readability of bar codes.

Compensation for dot gain is typically performed at the device DPI by removing one or more pels from the binary bar code data. However, removal of pels to compensate for dot gain is very coarse. Further, conversion of the modified binary barcode data to a different DPI is typically done using nearest neighbor scaling. This conversion method creates distortion of the bars and poor readability. If the scaling ratio is non integer this results in distorted bar and space sizes. Combined, these issues create poor barcode readability. Additionally, the variability in bar sizes due to the scaling further reduces barcode readability.

Accordingly, a mechanism for scaling barcode data to improve readability is desired.

SUMMARY

In one embodiment, a method is disclosed. The method includes receiving an image, upsampling the image, eroding the upsampled image to compensate for dot gain and scaling the eroded image to scale the image to a desired size.

In another embodiment, a printing system comprising an image scaling system to receive an image, upsample the image, erode the upsampled image to compensate for dot gain and scale the eroded image to scale the image to a desired size.

BRIEF DESCRIPTION OF THE DRAWINGS

A better understanding of the present invention can be obtained from the following detailed description in conjunction with the following drawings, in which:

FIGS. 3A-3D illustrate embodiments of a barcode during scaling conversion stages.

DETAILED DESCRIPTION

A mechanism for scaling image data to improve readability is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
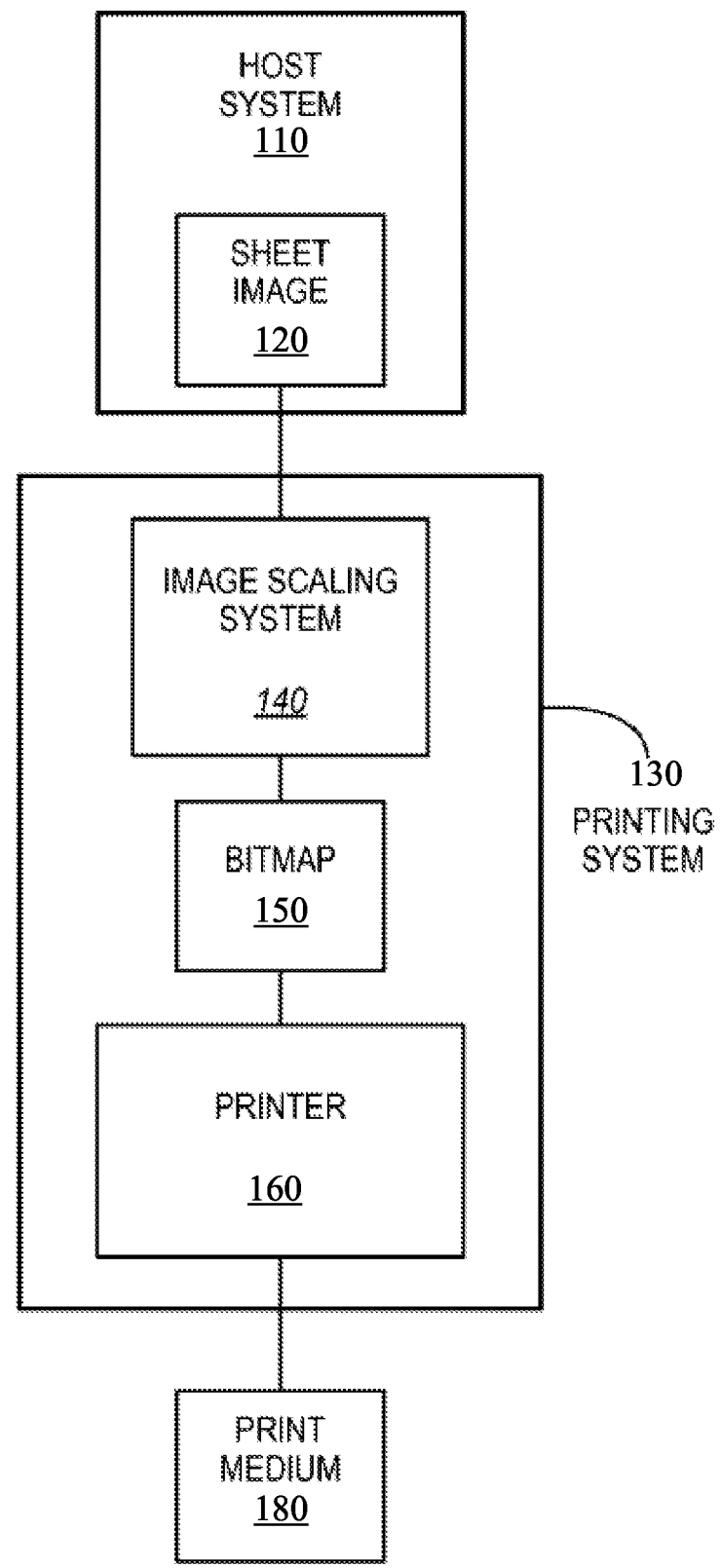
FIG. 1 illustrates one embodiment of a printing system.

FIG. 1 is a block diagram illustrating one embodiment of a printing system 100. Printing system 130 is a system used to provide marks on a media, such as a continuous forms printer or a cut sheet page printer. Printing system 130 may include any digital hardcopy output device, such as printers, copiers, multifunction printers (MFP's) and facsimiles.

A host system 110 is in communication with the printing system 130 to print a sheet image 120 onto a print medium 180 via a printer 160. The resulting print medium 180 may be printed in color and/or in any of a number of gray shades. The host system 110 may include any computing device, such as a personal computer or a server. The sheet image 120 may be any file or data that describes how an image on a sheet of print medium should be printed. For example, sheet image 120 may include PostScript data, Printer Command Language ("PCL") data, the Intelligent Printer Data Stream ("IPDS") data, and/or any other printer language data.

Printing system 130 may be a high-speed printer operable to print relatively high volumes (e.g., greater than 100 pages per minute). The print medium 180 may be continuous form paper, cut sheet paper, and/or any other medium suitable for printing. The printing system 130, in one generalized form, includes printer 160 that presents a bitmap 150 onto print medium 180 (e.g., via toner, ink, etc.) based on sheet image 120.

The image scaling system 140 may be any system, device, software, circuitry and/or other suitable component configured within printing system 130 that is operable to transform sheet image 120 and generate a scaled bitmap 150 for printing onto print medium 180 in accordance with the non integer scaling described above. The image scaling system 140 may be configured as part of a print controller of printing system 130 and/or any other portion of printing system 130. In another embodiment, image scaling system 140 may be configured with host system 110.

Figure 2:
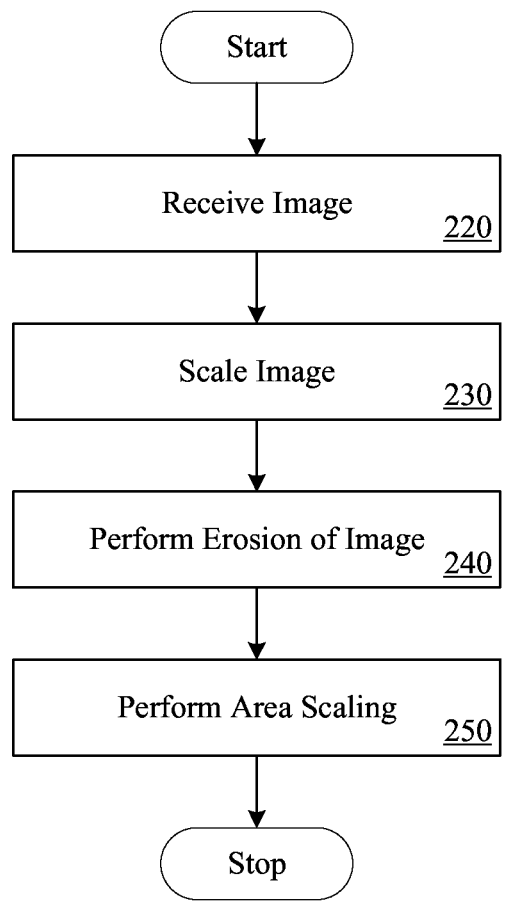
FIG. 2 is a flow diagram illustrating one embodiment of a scaling process.

FIG. 2 is a flow diagram illustrating one embodiment of a scaling process implemented at image scaling system 140. According to one embodiment, sheet image 120 includes a font used to generate a barcode and accompanying data. In a further embodiment, the font and characters in the font are laid out as an image at an original font resolution. FIG. 3A illustrates one embodiment of barcode and corresponding text indicating the contents of the barcode. The toned pels are black and the untoned pels are white.

At processing block 220, the image data is received at image scaling system 140 as binary data. At processing block 230, the binary data is upsampled using nearest neighbor scaling by a factor number (N) times. Since N is an integer, nearest neighbor scaling replicates sample values of the received image. Nearest neighbor scaling does not distort the image in this instance because integer scaling will create N pels for each pel in the original. In such an embodiment, the final image is binary at N times the DPI of the original data. FIG. 3B illustrates one embodiment of a section of the barcode magnified to show individual bars. FIG. 3B shows that the section has been converted from 300 DPI to 600 DPI using nearest neighbor scaling.

At processing block 240, the binary image is eroded to compensate for dot gain. In one embodiment, the erosion can be single sided to remove one pel. In such an embodiment, removal of one toned pel subtracts 1/N pel from the original width, due to the previous scaling. FIG. 3C illustrates one embodiment of the magnified section of the barcode in which one toned pel has been eroded from the right edge of each bar to compensate for dot gain. As can be seen in FIG. 3C, the bar widths have been narrowed. In another embodiment, two sided erosion, with an even number of total pels, may be implemented to preserve the centroid of the bar location. In this embodiment, half of the total pels are taken from each side.

At processing block 250, area scaling is performed on the eroded image to scale the image to the final desired size. This scaling produces contone data having minimal distortion using gray pels which faithfully represent the data at the new device resolution. FIG. 3D illustrates one embodiment of the magnified section of the barcode scaled down from 600 DPI to 360 DPI using area scaling. After area scaling, the edges of the barcode have gray pels. Thus in one embodiment, printer 160 performs a halftone on the data (e.g., using a stochastic algorithm), to convert the gray to binary or multibit pels which preserves the gray bar information.

Although described above with reference to barcodes, the scaling process may also be implemented to scale a group of rendered characters. For instance, the text shown in FIG. 3A may also be scaled according to the above-described process.

Figure 4:
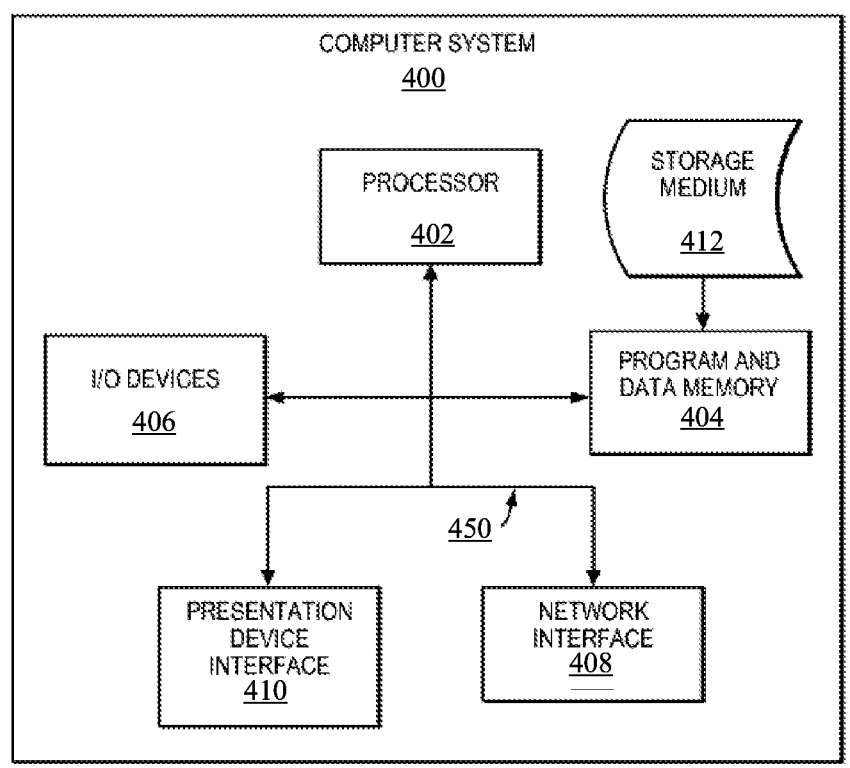
FIG. 4 illustrates one embodiment of a computer system.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 4 is a block diagram depicting a computer system 400 operable to provide features and aspects hereof by executing programmed instructions and accessing data stored on a computer readable storage medium 412.

Furthermore, embodiments of the invention can take the form of a computer program accessible via a computer-readable medium 412 providing program code for use by a computer or any other instruction execution system. For the purposes of this description, a computer readable medium 412 can be anything that can contain, store, communicate, or transport the program for use by the computer other instruction execution system.

The computer readable medium 412 can be an electronic, magnetic, optical, electromagnetic, infrared, or semiconductor device. Examples of the computer readable medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The computer system 400, being suitable for storing and/or executing the program code, includes at least one processor 402 coupled to memory elements 404 through a system bus 450. The memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
   receiving an image;
   upsampling the image;
   eroding the upsampled image compensating for dot gain; and
   scaling the eroded image to scale the image to a desired size.

2. The article of manufacture of claim 1 wherein the image includes a font used to generate the image and character data.

3. The article of manufacture of claim 2 wherein the font and characters in the font are laid out as an image at an original font resolution.

4. The article of manufacture of claim 1 wherein the image is upsampled using nearest neighbor scaling by an integer factor number (N) times.

5. The article of manufacture of claim 4 wherein the nearest neighbor scaling is implemented via an integer scaling to generate N times N pels for each pel in the image.

6. The article of manufacture of claim 4 wherein the erosion is single sided to remove one toned pel from a string of toned pels in either or both horizontal and vertical directions.

7. The article of manufacture of claim 6 wherein the removal of one pel subtracts 1/N pel from the width and 1/N pel from the length.

8. The article of manufacture of claim 4 wherein the erosion is two sided to preserve the image location.

9. The article of manufacture of claim 8 wherein half of the total pels are taken from each side of each contiguous toned group of pels.

10. The article of manufacture of claim 1 wherein the scaling produces contone data having minimal distortion having gray pels to represent the image data at a new resolution.

11. The article of manufacture of claim 10 wherein the scaled image is halftoned to preserve information.

12. The article of manufacture of claim 1 wherein the image comprises a barcode.

13. The article of manufacture of claim 1 wherein the image comprises text.

* * * * *